US007437446B2

(12) United States Patent
Bailey et al.

(10) Patent No.: US 7,437,446 B2
(45) Date of Patent: Oct. 14, 2008

(54) REPORTING OF ABNORMAL COMPUTER RESOURCE UTILIZATION DATA

(75) Inventors: Philip G. Bailey, Wyoming (AU); Peter M. W. Poortman, Green Bay (NZ)

(73) Assignee: Electronic Data Systems Corporation, Plano, TX (US)

( * ) Notice: Subject to any disclaimer, the term of this patent is extended or adjusted under 35 U.S.C. 154(b) by 110 days.

(21) Appl. No.: 10/977,497

(22) Filed: Nov. 1, 2004

(65) Prior Publication Data

US 2005/0120111 A1   Jun. 2, 2005
US 2006/0200546 A9   Sep. 7, 2006

Related U.S. Application Data

(63) Continuation-in-part of application No. 10/259,786, filed on Sep. 30, 2002.

(51) Int. Cl.
G06F 15/173   (2006.01)
G06F 15/177   (2006.01)
(52) U.S. Cl. .................. 709/223; 709/221; 709/224; 709/227
(58) Field of Classification Search ................. 709/223, 709/224, 219, 227, 221
See application file for complete search history.

(56) References Cited

U.S. PATENT DOCUMENTS 5,668,944 A   9/1997   Berry
5,696,701 A   12/1997  Burgess et al.
5,758,071 A   5/1998   Burgess et al.
5,761,091 A   6/1998   Agrawal et al.
5,796,633 A   8/1998   Burgess et al.

(Continued)

FOREIGN PATENT DOCUMENTS

EP   0 940 754   9/1999

(Continued)

OTHER PUBLICATIONS

Notification Concerning Transmittal of International Preliminary Report on Patentability (1 page); International Preliminary Report on Patentability (1 page); Written Opinion of the International Searching Authority (5 pages); all mailed on May 10, 2007.

(Continued)

*Primary Examiner*—Ario Etienne
*Assistant Examiner*—Sargon N Nano
(74) *Attorney, Agent, or Firm*—Fish & Richardson, p.c.

(57) ABSTRACT

Identifying computer resource utilization issues includes accessing resource utilization data for a computer system for a particular period of time. The resource utilization data for the particular period of time is based on resource utilization data collected while processes were running on the computer system. The resource utilization data for the particular period of time includes measurements of a metric of operation of a component of the computer system. Each measurement is associated with a period of time. Statistical analysis is performed on the resource utilization data to identify a range of normal measurements for the metric for the particular period of time included in the resource utilization data. Measurements of the metric of the resource utilization data for the particular period of time are compared with the identified range of normal measurements to identify measurements that are outside of the identified range of normal measurements.

26 Claims, 9 Drawing Sheets

U.S. PATENT DOCUMENTS

| | | | |
|---|---|---|---|
| 5,949,415 A | 9/1999 | Lin et al. | |
| 5,958,009 A | 9/1999 | Friedrich et al. | |
| 5,961,596 A | 10/1999 | Takubo et al. | |
| 6,076,105 A | 6/2000 | Wolff et al. | |
| 6,128,628 A | 10/2000 | Waclawski et al. | |
| 6,148,335 A * | 11/2000 | Haggard et al. | 709/224 |
| 6,192,490 B1 | 2/2001 | Gross | |
| 6,230,204 B1 | 5/2001 | Fleming, III | |
| 6,258,785 B1 * | 7/2001 | Su et al. | 514/29 |
| 6,269,401 B1 * | 7/2001 | Fletcher et al. | 709/224 |
| 6,321,264 B1 * | 11/2001 | Fletcher et al. | 709/224 |
| 6,327,677 B1 | 12/2001 | Garg et al. | |
| 6,363,477 B1 * | 3/2002 | Fletcher et al. | 713/151 |
| 6,405,327 B1 | 6/2002 | Sipple et al. | |
| 6,457,142 B1 | 9/2002 | Klemm et al. | |
| 6,487,578 B2 | 11/2002 | Ranganathan | |
| 6,493,318 B1 * | 12/2002 | Bare | 370/238 |
| 6,516,348 B1 * | 2/2003 | MacFarlane et al. | 709/224 |
| 6,557,035 B1 | 4/2003 | McKnight | |
| 6,584,501 B1 | 6/2003 | Cartsonis et al. | |
| 6,618,709 B1 * | 9/2003 | Sneeringer | 705/412 |
| 6,651,062 B2 | 11/2003 | Ghannam et al. | |
| 6,665,268 B1 * | 12/2003 | Sato et al. | 370/242 |
| 6,683,856 B1 * | 1/2004 | Brinkman et al. | 370/249 |
| 6,691,067 B1 * | 2/2004 | Ding et al. | 702/186 |
| 6,748,416 B2 | 6/2004 | Carpenter et al. | |
| 6,751,662 B1 | 6/2004 | Natarajan et al. | |
| 6,769,024 B1 | 7/2004 | Natarajan et al. | |
| 6,772,411 B2 * | 8/2004 | Hayes et al. | 717/127 |
| 6,801,940 B1 * | 10/2004 | Moran et al. | 709/224 |
| 6,802,054 B2 | 10/2004 | Faraj | |
| 6,836,800 B1 * | 12/2004 | Sweet et al. | 709/224 |
| 6,839,070 B2 | 1/2005 | Meandzija et al. | |
| 6,862,623 B1 | 3/2005 | Odhner et al. | |
| 6,985,940 B1 * | 1/2006 | Jenkin | 709/224 |
| 6,990,071 B2 * | 1/2006 | Adam et al. | 370/230 |
| 6,996,517 B1 * | 2/2006 | Papaefstathiou | 703/22 |
| 6,999,961 B2 | 2/2006 | Hall | |
| 7,028,301 B2 * | 4/2006 | Ding et al. | 718/104 |
| 7,032,063 B1 * | 4/2006 | Kurpanek | 710/316 |
| 7,051,098 B2 | 5/2006 | Masters et al. | |
| 7,093,004 B2 * | 8/2006 | Bernardin et al. | 709/219 |
| 7,099,797 B1 * | 8/2006 | Richard | 702/182 |
| 7,152,105 B2 * | 12/2006 | McClure et al. | 709/224 |
| 7,167,821 B2 | 1/2007 | Hardwick et al. | |
| 7,225,249 B1 * | 5/2007 | Barry et al. | 709/227 |
| 7,243,175 B2 | 7/2007 | Poortman | |
| 7,272,155 B2 | 9/2007 | Kenney et al. | |
| 7,299,277 B1 * | 11/2007 | Moran et al. | 709/224 |
| 2002/0138559 A1 * | 9/2002 | Ulrich et al. | 709/203 |

FOREIGN PATENT DOCUMENTS

| | | |
|---|---|---|
| WO | WO 00/19664 | 4/2000 |
| WO | WO 02/097630 | 12/2002 |
| WO | WO 03/005279 | 1/2003 |

OTHER PUBLICATIONS

International Search Report, Application No. PCT/US03/30516 dated Aug. 3, 2005 (3 pages).

*AIX Version 3.2—System Management Guide; Operating System and Devices*, Chapter 14—System Accounting; (Oct. 1, 1993), XP002067192, (pp. 14-1-14-29) (29 pages).

Notification of Transmittal of the International Search Report and the Written Opinion of the International Searching Authority, or the Declaration (2 pages), International Search Report (4 pages); and Written Opinion of the International Searching Authority (5 pages) re International Application No. PCT/US2005/033444 dated Apr. 11, 2006.

Gross, Kenny C. et al., *Proactive Detection of Software Aging Mechanisims in Performance Critical Computers*, Proceedings of the 27th Annual NASA Goddard/IEEE Software Engineering Workshop (SEW-27/02), Dec. 5-6, 2002, Piscataway, NJ, USA, pp. 17-23.

* cited by examiner

REPORTING OF ABNORMAL COMPUTER RESOURCE UTILIZATION DATA

CROSS REFERENCE TO RELATED APPLICATIONS

This application is a continuation-in-part of U.S. application Ser. No. 10/259,786, filed Sep. 30, 2002, and titled GENERATION OF COMPUTER RESOURCE UTILIZATION DATA PER COMPUTER APPLICATION, which is incorporated by reference in its entirety.

TECHNICAL FIELD

This description relates to generating and reporting resource usage information for one or more computer systems.

BACKGROUND

Computer hardware resource usage information may include, for example, the processing capacity and memory capacity currently and historically used on each computer of a computer system. This information may be useful to computer system managers. Computer hardware resource usage information also may be referred to as resource usage information or resource utilization information.

Resource usage information for a computer system may be compared with other resource usage information, including historical resource usage information, to identify abnormal resource usage information. Abnormal resource usage information may be indicative of abnormal operation, suboptimal operation, or failure of the computer system. Abnormal resource usage information may be identified manually for a computer system for which resource utilization data is gathered. Such manual analysis may be burdensome, especially when the number of computer systems for which resource utilization data is gathered is large.

SUMMARY

In one general aspect, identifying computer resource utilization issues includes accessing resource utilization data for a computer system for a particular period of time. The resource utilization data for the particular period of time is based on resource utilization data collected while processes were running on the computer system. The resource utilization data for the particular period of time includes measurements of a metric of operation of a component of the computer system. Each measurement is associated with a period of time. Statistical analysis is performed on the resource utilization data to identify a range of normal measurements for the metric for the particular period of time included in the resource utilization data. Measurements of the metric of the resource utilization data for the particular period of time are compared with the identified range of normal measurements to identify measurements that are outside of the identified range of normal measurements.

Implementations may include one or more of the following features. For example, a report that identifies measurements of the metric that are outside of the identified range of normal measurements may be generated. Generating reports may include generating one or more charts that include indications of the identified range of normal measurements for the metric and the measurements of the metric.

Accessing resource utilization data may include accessing resource utilization data that is based on resource utilization data collected while processes were running on one or more computer systems and aggregated to produce resource utilization data for the one or more computer systems. Generating the report that identifies measurements of the metric that are outside of the identified range of normal measurements may include generating reports indicating measurements that are outside of the corresponding ranges of normal measurements for only the computer systems on which those measurements occurred.

A measurement that is outside of the identified range of normal measurements may represent failure of one or more computer applications running on the computer system.

Historical resource utilization data for a computer system may be accessed. The historical resource utilization data may be based on resource utilization data collected while processes were running on the computer system. The historical resource utilization data may include measurements of the metric. Each measurement may be associated with a period of time.

Performing statistical analysis may include performing statistical analysis on the historical resource utilization data to identify the range of normal measurements. Performing statistical analysis may include identifying a range of measurements within a predetermined number of standard deviations from an average measurement of the metric for the particular period of time as the range of normal measurements for the metric for the particular period of time. Performing statistical analysis may include calculating predicted values of future measurements of the metric based on the historical resource utilization data. The predicted values may be used to identify the range of normal measurements of the metric for the particular period of time.

Accessing the resource utilization data may include accessing the resource utilization data from a central server or from the computer system.

Performing the statistical analysis may include performing the statistical analysis on a computer system that is separate from the computer system for which the resource utilization data is accessed.

These general and specific aspects may be implemented using a system, a method, or a computer program, or any combination of systems, methods, and computer programs.

Other features will be apparent from the description and drawings, and from the claims.

DESCRIPTION OF DRAWINGS

Like reference symbols in the various drawings indicate like elements.

DETAILED DESCRIPTION

Resource utilization data for one or more computer systems is analyzed to identify and report abnormal resource utilization data. Resource utilization data may include measurements of one or more performance metrics, such as the utilization of a central processing unit (CPU) of a computer system, or one or more capacity metrics, such as the utilization of memory of the computer system. Statistical analysis is used to identify ranges of normal measurements for the metrics included in the resource utilization data. Measurements of a metric that fall outside of the range of normal measurements for the particular metric are identified as abnormal. Abnormal measurements may be indicative of abnormal operation, suboptimal operation, or failure of the computer system that may be associated with a problem within the computer system, and reports identifying the abnormal measurements may be generated such that the problem may be corrected before more adversely affecting the operation of the computer system. The reports may be graphs that indicate the ranges of normal measurements and the abnormal measurements that are outside of the ranges of normal measurements. When resource utilization data is gathered for multiple computer systems, reports may be generated only for the computer systems from which abnormal resource utilization data was gathered.

Figure 1:
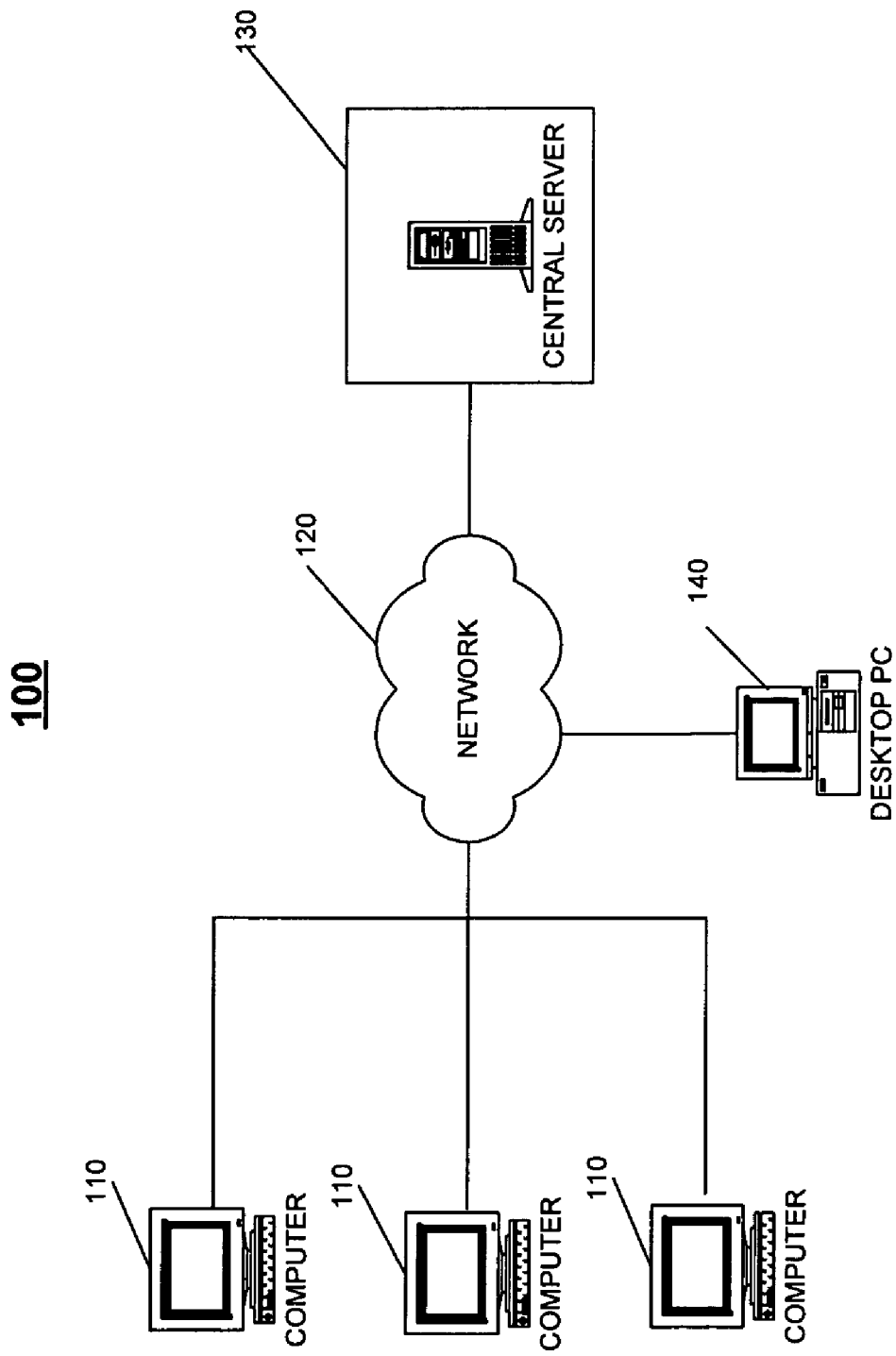
FIG. 1 is an illustration of a computer system that is able to analyze resource utilization data for components of the computer system.

Referring to FIG. 1, a computer system 100 that is able to generate reports of computer resource use per computer application includes Unix or similar computers 110 connected through a network 120 to a central Unix or similar server 130. A desktop computer 140 is also connected to the network 120.

Each computer 110 may be any computing platform that is able to run scripts (i.e., lists of computer commands that may be executed without user interaction) and generate and send American Standard Code for Information Interchange (ASCII) files. Each computer 110 processes scripts that generate computer resource utilization data files for that computer. These data files may be ASCII files and may be periodically sent to the central server 130 for processing. Versions of UNIX may include those provided by Sun (SunOS), IBM Advanced Interactive Executive (AIX), Hewlett Packard (HP-UX), Compaq (OSF1), and Silicon Graphics (IRIX). The resource utilization data files may be, for example, comma separated variable (csv) text files.

The network 120 allows the computers 110 and the desktop computer 140 to communicate with the central server 130. The network 120 may be the Internet, a local area network (LAN), or a wide area network (WAN). The computers 110, the central server 130, and the desktop computer 140 may send ASCII files to one another using the network 120 and any network communications protocol capable of file transfer. Examples of network communications protocols capable of file transfer include file transfer protocol (ftp) and simple mail transfer protocol (SMTP). For UNIX-based computers, RSHELL may be used to output the data directly.

The central server 130 may be any computing platform able to generate, send, and receive ASCII files and run scripts. The central server 130 may be a separate standalone unit as shown in FIG. 1 or may be one of the computers 110. The central server 130 periodically receives computer resource utilization data files from each computer 110 and processes the computer resource utilization data files to create report data files as ASCII files. The central server 130 stores the report data files, and these are subsequently accessed by the desktop computer 140 via, for example, Network File Sharing connectivity. In one implementation, the central server 130 is a platform that runs a version of UNIX, and the report data files are csv text files.

The desktop computer 140 may be any computer that is able to request and receive ASCII files from the central server 130 and to run a report production application capable of generating computer resource utilization reports based on the received report data files. The desktop computer 140 may be local or remote to the central server 130 or to one or more of the computers 110. In one implementation, the desktop computer 140 is a personal computer that runs a desktop publishing software program that includes report templates. In another implementation, the desktop computer 140 is a server that runs the desktop publishing software program. The report data files are copied directly into the data sheets of the report templates, and the reports are subsequently generated through the use of macros. The desktop publishing software may be, for example, a spreadsheet program, such as a version of Excel by Microsoft Corporation of Redmond, Wash.

The techniques described herein may be applied to a context in which computer services are provided to customers, and may be applied, for example, to identify and report abnormal operation, suboptimal operation, failures, or service outages to customers. For example, the techniques may be used to identify and quantify the extent of abnormal operation, suboptimal operation, failures, or service outages of computer services provided to customers. The computer services may include data storage, data search and retrieval, and/or maintenance and operation of computer servers. The customers may be internal or external to the provider of the computer services. For example, a customer may be a division of a company that includes the computer services provider. Alternatively or additionally, the customer may be an entity external to the company that provides the computer services. The techniques described herein may be particularly useful when the computer services provider operates and maintains a large number of computer systems on behalf of the customers. In one example, the techniques may be used to identify computer systems that are operating abnormally and the extent or duration of the abnormal operation may be quickly and easily identified.

Figure 2:
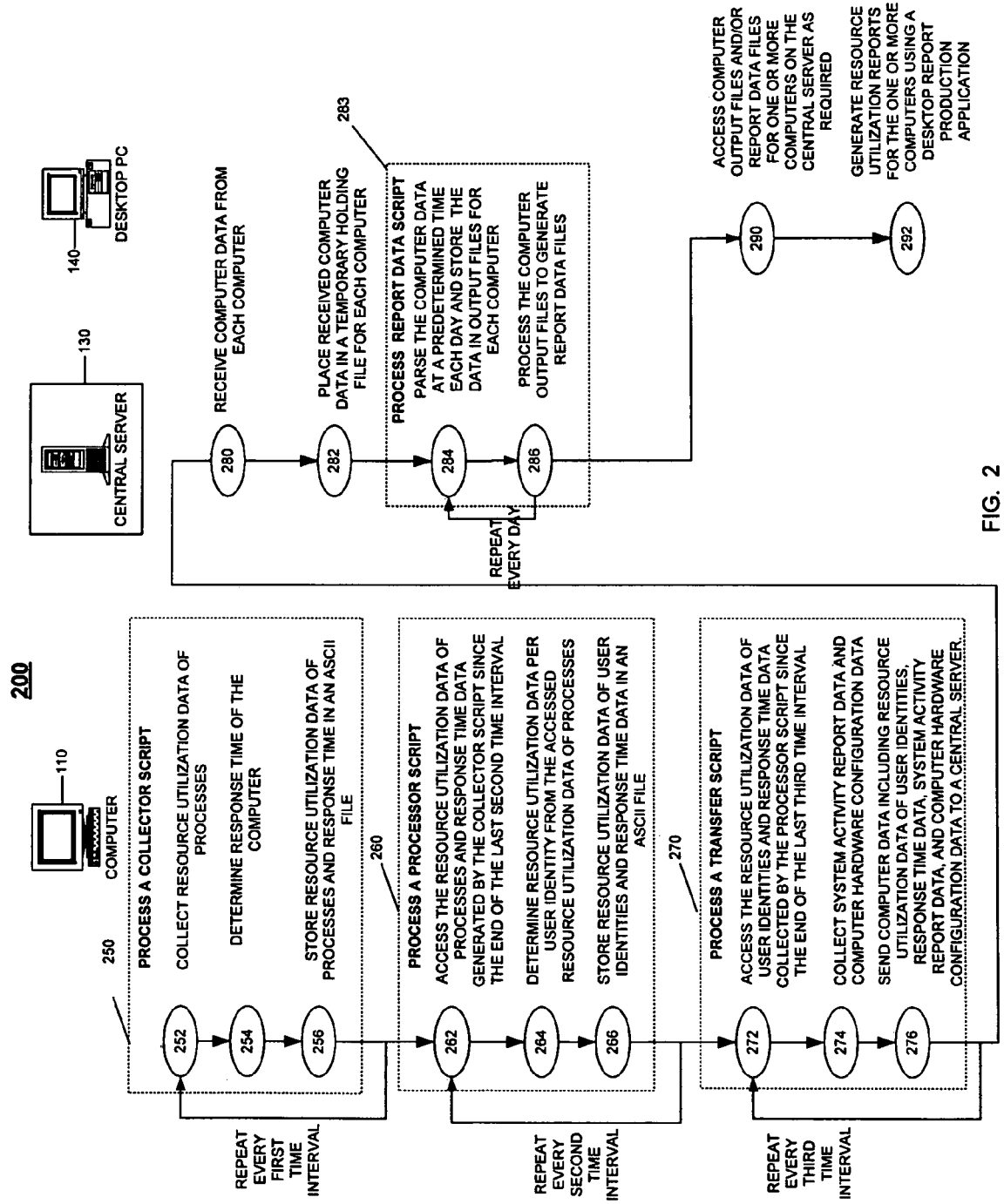
FIG. 2 is a flow chart of a process for generating resource utilization data for components of the computer system of FIG. 1.

Referring to FIG. 2, a process 200 for generating resource utilization reports for computers 110 is carried out by one or more computers 110, the central server 130, and the desktop computer 140. The process 200 includes having a computer 110 repeatedly process a collector script at the end of first time intervals (250), repeatedly process a processor script at the end of second time intervals (260), and repeatedly process a transfer script at the end of third time intervals (270). In some implementations, the first time interval is shorter in duration than the second time interval, which, in turn, is shorter in duration than the third time interval. In one particular implementation, the second time interval has a duration of "n" first time intervals, where "n" is an integer greater than one. Similarly, the third time interval has a duration of "m" second time intervals, where "m" is an integer greater than one. The time granularity of some of the data collected is determined by the duration of the time intervals.

Processing the collector script (250) includes processing a script that collects resource utilization data of processes (e.g., resource utilization data of executing programs) (252), determines the response time of the computer (254), and stores the resource utilization data and computer response time data in an ASCII file (256).

The processes for which resource utilization data is collected (252) may include processes that are currently active and processes that are defined as transient. Processes that are currently active are programs that are currently being executed by the computer at the time the collector script is run. Processes that are transient are processes that are not being executed by the computer when the collector script is run but were executed completely (e.g., execution began and ended) within the last first time interval. In some implementations, transient processes may be defined more broadly as processes that began within the last two first time intervals and ended within the last first time interval.

Resource utilization data of processes may include data entries containing a user identity for the process, a command instruction, a process identity, the amount of central processing unit (CPU) processing time that the process has used to date, and the amount of memory the process is currently holding. The user identity is a label for the entity that originally launched the process. The entity may be a person, an application, or the computer itself. An application is a program or group of programs designed for end users. The command instruction is the instruction used by the entity to launch the process. The process identity is typically a number that identifies a specific process. The CPU processing time may be expressed in CPU seconds, and the amount of memory held by the process may be expressed in kilobytes.

The response time of the computer may be determined (254) by executing a standard set of commands on the computer 110 and timing how long it takes to run these commands. This set of commands simulates the load imposed by a typical application transaction. The set of commands may be divided into subsets of commands that are configured to exercise different resources of the computer. For example, one subset of commands may exercise the CPU resources of the computer, as a computer with an overloaded CPU will take longer to process the transaction. Similarly, another subset of commands may exercise the memory resources of the computer, as a computer that is memory constrained will take longer to process the transaction. Another subset of commands may be used to estimate how slow or fast the computer is able to read and write data (e.g., the speed of file system usage). These subsets of commands are typically executed thousands of times in order to get an appreciable response time value (e.g., a value in seconds).

Computer response time is a relative estimate that may be used to get an indication of how overloaded the computer 110 is when the collector script is executed. The response time is typically not used directly but rather is compared to previous response times of the computer or to response times of other computers.

The computer response time and the resource utilization data of processes are stored in an ASCII file (256). In one implementation, one ASCII data file is maintained for all of the data collected by the collector script in one second time interval. If the collector script runs n times every second time interval, then the data file will include n sets of data, with each set being appended to the preceding set. Alternatively, each set of data may be placed in its own file. Furthermore, resource utilization data of processes and computer response time data may be stored in separate files.

Processing the processor script (260) includes processing a script that accesses the resource utilization data of processes and the response time data generated by the collector script since the end of the last second time interval (262), determines the resource utilization data per user identity from the accessed resource utilization data of processes (264), and stores the resource utilization data of user identities and response time data in an ASCII file (266).

Accessing the resource utilization data and the response time data (262) includes accessing the one or more ASCII files containing data generated by the collector script since the processor script was last executed. The processor script is therefore able to access multiple sets of data collected at the end of each first time interval. The number of sets collected is, therefore, equal to the number of times that the duration of a first time interval fits within the duration of a second time interval. For example, if the first time interval is five minutes and the second time interval is one hour, twelve sets of data are collected, and all twelve sets are accessed by the processor script. In some implementations, however, processor script calculations may require access to an extra set of data from the last first time interval in the previous second time interval.

The processor script processes the process resource utilization data into resource utilization data per user identity (264) by parsing the data sets by user identity to obtain subsets of process resource utilization data with the same user identity and performing calculations on the resulting subsets. The resource utilization data per user identity may include an estimate of CPU use, an estimate of memory use, and an estimate of the number of active database sessions that occurred in the second time interval.

An estimate of CPU use per user identity may be calculated, for example, by determining the total amount of CPU seconds used by all of the processes launched by that user identity in the second time interval. This calculation requires determining the total CPU time used by each process in the second time interval and then adding up these total CPU times for the processes that were launched by the same user identity. For example, if user identity "unicentr" launched processes 123, 254, and 9, and processes 123, 254, and 9 used, respectively, 1100, 23, and 400 CPU seconds in the second time interval, then the total CPU time used by user identity "unicentr" in the second time interval is 1523 (1100+23+400) CPU seconds.

The total CPU time used by each process in the second time interval may be calculated from the CPU data entries collected by the collector script for that process. For example, if the CPU data entries collected by the collector script for that process correspond to the amount of processing time that the process has used to date, the total CPU time used by each process in the second time interval may be calculated by subtracting the lowest CPU data entry collected for that process in the second time interval from the highest CPU data entry collected for that process in the second time interval. To illustrate, if the highest CPU data entry collected for process 123 is 1230 (e.g., total CPU seconds used to date by process 123 is 1230 seconds) and the lowest CPU data entry collected for process 123 is 220, then the total CPU time used by process 123 over the last second time interval is 1010 (1230−220) CPU seconds.

An estimate of memory use per user identity may also be calculated by, for example, calculating the total amount of memory held by the user identity at the end of each first time interval and averaging this total over the number of first time intervals in a second time interval. The total amount of memory held by the user identity at the end of each first time interval is obtained by adding up the amount of memory held for each process launched by the user identity and for which memory data was collected by the collector script. For example, if the first time interval is twenty minutes and the second time interval is one hour, then three sets of date are collected by the collector script. If user identity "fas" has launched three processes with process identities 5, 123, and 253, and the collected memory data for each process is that shown in Table 1, the total memory held by user identity "fas" is 33+90+27=150 Kbytes at time 20, 60+60+0=120 Kbytes at time 40, and 0+150+0=150 Kbytes at time 60. The average memory held by the user identity "fas" over the last hour (e.g., second time interval) may then be calculated as (150+120+150)/3=140 Kbytes.

TABLE 1

| Process ID: | Time | Amt of Memory Held |
|---|---|---|
| 5 | 20 | 33 Kbytes |
|  | 40 | 60 Kbytes |
|  | 60 | 0 |
| 123 | 20 | 90 Kbytes |
|  | 40 | 60 Kbytes |
|  | 60 | 150 Kbytes |
| 253 | 20 | 27 Kbytes |
|  | 40 | 0 Kbytes |
|  | 60 | 0 Kbytes |

An estimate of the number of active database sessions that occurred in the second time interval on a given database may be determined, for example, by examining the command instruction data entry collected for each process launched by that database (e.g., for each process that has a user identity corresponding to that database). The collected command instructions for each process may be analyzed to see whether they contain keywords that suggest that the process corresponds to an active session. The number of different processes that are active for at least some portion of the second time interval and that are identified as corresponding to an active session are then counted to determine a total number of active database sessions for the second time interval.

Once the resource utilization data per user identity is determined, the data may be stored in an ASCII file (266). The response time data may be aggregated and appended to the end of the ASCII file, or alternatively, may be aggregated and stored in a separate file.

Processing the transfer script (270) includes processing a script that accesses the resource utilization data of user identities and response time data collected by the processor script since the end of the last third time interval (272), collects system activity report data and computer hardware configuration data (274), and sends the collected computer data to the central server (276). The collected computer data includes the resource utilization data of user identities, the response time data, the system activity report data, and the computer hardware configuration data.

Accessing the resource utilization data of user identities and response time data (272) includes accessing the one or more ASCII files generated by the processor script since the transfer script was last executed. The transfer script is therefore able to access multiple sets of collected data, with each set having been collected by the processor script at the end of a second time interval. The number of data sets collected is, therefore, equal to the number of times that the duration of a second time interval fits within the duration of a third time interval. For example, if the second time interval is one hour and the third time interval is one day, twenty-four sets of data are collected, and all twenty-four sets are accessed by the transfer script.

The system activity report data collected by the transfer script (274) includes general computer level resource utilization data. The computer 110 may be instructed to measure and store this data at regular intervals (e.g., every 10 minutes) in an appropriate file. The transfer script may then access the file and collect all or some of the data as desired. Most computers are able to provide a vast number of different types of computer level resource utilization data.

Some types of computer level resource utilization data, however, are particularly useful in estimating the load on the computer. For example, CPU utilization (e.g., percent of total CPU seconds being used by active processes on the computer) may be examined as an indicator of the overall CPU load of the applications currently running on the computer. The amount of memory that is being swapped in and out from storage may be examined as an indicator of whether the computer is memory constrained. A computer that has insufficient memory is forced to increase its rate of swapping. The number of processes in a process queue that are waiting to be executed may be used as a measure of how overloaded the computer is in general. The transfer script, therefore, may collect all computer level resource utilization data available or, alternatively, may collect only the types of computer level resource utilization data that are useful in estimating the load on the computer.

The computer hardware configuration data collected by the transfer script (274) may include CPU-related hardware data (e.g., number of CPUs, clock frequency, or cache size), memory-related hardware data (e.g., physical memory installed), and input/output (I/O) card-related data (e.g., I/O boards, bus type, slot, or model). The transfer script may also collect processor usage statistics and file system usage data.

The computer data is then sent in one or more files to the central server (276). As a result, the central server 130 receives a new computer data set from each computer 110 at the end of every third time interval (280).

Upon receiving the computer data from a computer 110 (280), the central server 130 places the computer data in a temporary holding file for each computer (282). The central server typically receives computer data from a large number of computers over the course of a day.

The central server 130 processes a report data script (283) at a designated time each day. Processing the report data script includes processing a script that parses the computer data and stores the data in output files for each computer (284), and processes the computer output files to generate report data files (286). The central server 130 may aggregate computers 110 into clusters based on, for example, the geographic region in which the computers 110 are located. The report data script may then be processed multiple times and at different times each day. For example, the report data script may be processed one time for each cluster.

Parsing the computer data (284) includes extracting the computer data from the temporary holding file, separating the data into different portions, and storing each portion in a different output file. The purpose of the separation and storage of the data in different output files is to facilitate the subsequent processing of the data into report data files. In one implementation, the resource utilization data per user identity and the computer response time data are separated and stored in one file and the system activity report data and the computer hardware configuration data are separated and stored in another output file.

The computer output files are processed to generate report data files (286) that may be sent to the desktop computer 140. The processing of the computer output files typically includes parsing the data (e.g., parse by application, by day, by month, by hour) and performing various standard statistical processes on the data (e.g., obtain peak values, average values, moving averages, and minimum values).

The output files may be processed to generate report data files that serve specific purposes. For example, reports that show resource utilization data per application per computer are particularly useful for determining how best to allocate applications among different computers in order to prevent computer overloads. These reports may also be used for billing purposes to allocate application costs to customers. Generation of the report data for these reports requires processing the resource utilization data per user identity stored in the output files into resource utilization data per application. This processing involves mapping one or more user identities to each application.

The mapping of user identities to applications may be accomplished manually or automatically. For manual mapping, a computer administrator identifies the user identities that correspond to a specific application by identifying the user identities employed by users of the application, the user identities employed by other applications that use the application, and/or the user identities employed by the application itself. The identified user identities are then manually mapped to the application by, for example, filling in entries in a table. The corresponding resource utilization data per user identity may be aggregated to obtain resource utilization data for the application.

For automatic mapping, user identities that use a significant amount of the computer's capacity (e.g., CPU capacity) may be mapped to an application with the same name as the user identity. User identities that do not use a significant amount of the computer's capacity may be mapped to an application called "other." For example, if "oracle" is a user identity that has used 12% of the total CPU seconds of the computer in a given time interval and 10% or more is considered to be a significant amount of the computer's CPU processing capacity, then the user identity "oracle" is automatically mapped to a newly created application named "oracle." On the other hand, if the user identity "oracle" has only used 5% of the total CPU seconds of the computer in a given time interval, then the user identity "oracle" is automatically mapped to the application named "other." In this way, user identities that require significant amounts of processing are associated with an application of the same name while user identities that do not require significant processing are lumped into an application named "other." The mapping of user identities to applications is typically accomplished by using a combination of both manual and automatic mapping.

Reports that show future resource utilization forecasts per computer are also useful in estimating future resource capacity demands. Computer purchases and upgrades may be planned ahead of time by examining such reports. Standard forecasting techniques may be applied to the computer data to generate report data that estimates future resource utilization for each computer.

Computer health reports that inform computer resource personnel when and whether a given computer is overloaded, underused or currently experiencing problems are also useful for diagnostic purposes. These reports may be generated by processing the data in the output files to create report data files that include red flags. The red flags are generated based on values of selected parameters in the computer data in accordance with a predetermined condition. For example, a red flag may be generated if certain resource utilization parameters are determined to be above or below a predetermined threshold (e.g., CPU use greater than 80%).

Computer hardware configuration reports are also useful in informing computer resource personnel when and how a given computer's hardware has changed over time (e.g., upgrades of CPU, memory and storage). The hardware configuration data in the output files may be processed to identify hardware changes including the time of the change and the type of change that occurred.

The central server 130 stores all the report data files and/or the computer output files for one or more computers. These report data files are accessed later by the desktop computer 140 for report production. The desktop computer accesses the computer output files and/or the report data files for one or more computers from the central server (290) using, for example, Network File Sharing connectivity. The desktop computer then is able to generate resource utilization reports for the one or more computers using a desktop report production application (292).

The desktop computer 140 may further process both the computer data files and the report data files prior to generating the resource utilization reports. The report data files, the computer data files, or the further processed files may be accessed by the desktop report production application to generate reports. For example, the data files may be directly inserted in the data sheets of a report template and the report may be automatically generated using macros.

In one implementation, UNIX servers may be used as computers 110 and central server 130, and a personal computer may be used as the desktop computer 140. The UNIX servers may be programmed to run a collector script at the end of every five minutes (i.e., the first time interval is five minutes), a processor script at the end of every hour (i.e., the second time interval is one hour), and a transfer script at the end of every day (i.e., the third time interval is one day). The UNIX servers may be programmed to run the scripts automatically at these times by adding entries to the choronology tables (crontabs) of the servers. For example, the "sys crontab" may include an entry that causes system activity report data to be generated and stored every ten minutes. The "adm crontab" may include an entry that invokes process accounting one minute past midnight. Process accounting is a UNIX feature that provides process statistics and may be used to estimate the amount of CPU time used by transient processes. The "adm crontab" may include entries that invoke the collector script every five minutes starting on the hour, the processor script every hour starting at minute 57 of the hour, and the transfer script every day starting at one minute before midnight. In this case, the collector script is executed at 00:00, 00:05, 00:10, . . . , 23:50, and 23:55. The processor script is executed at 00:57, 01:57, 02:57, . . . , 22:57, and 23:57. And the transfer script is executed and sends data to the central server at 23:59.

Figure 3:
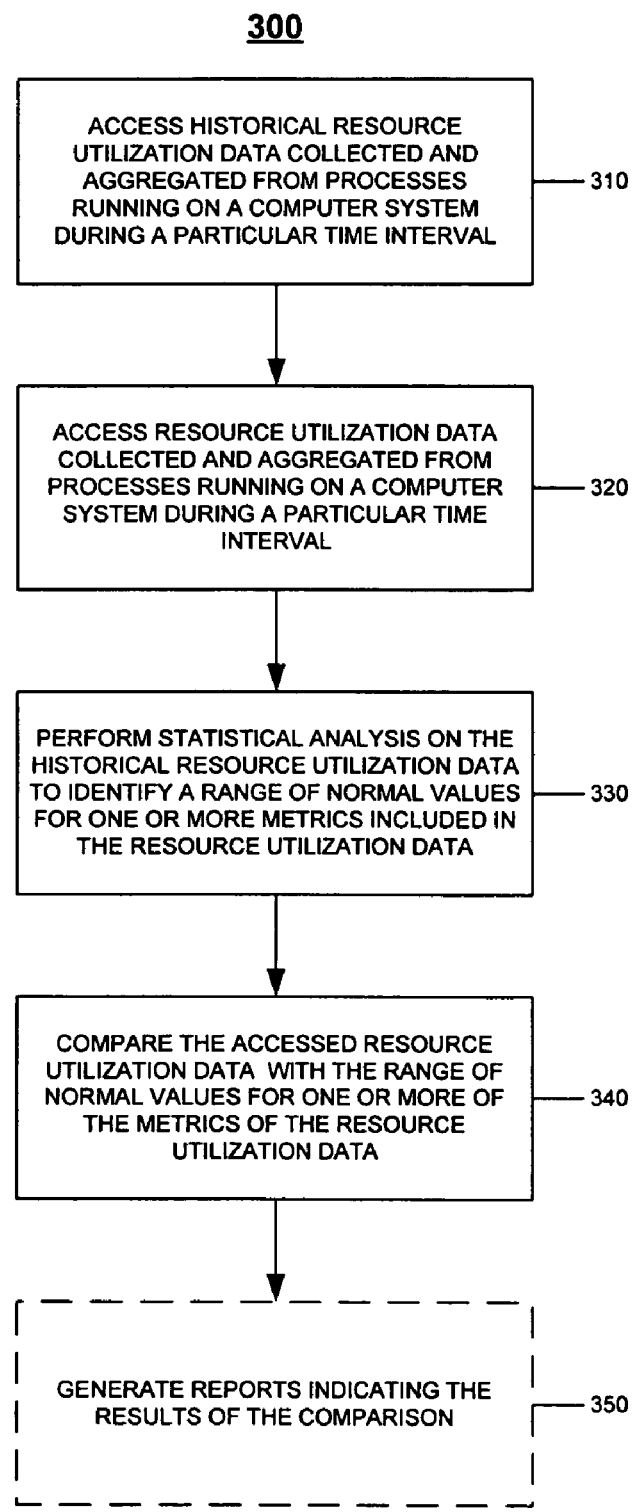
FIG. 3 is a flow chart of a process for identifying and reporting abnormal resource utilization data for a computer system.

Referring to FIG. 3, a process 300 is used to identify and generate reports of abnormal resource utilization data gathered for a computer system. In general, the process 300 accesses resource utilization data gathered for a computer system, such as by using the process 200 of FIG. 2, and performs a statistical analysis of the gathered data to identify abnormal resource utilization data. In particular, the statistical analysis identifies ranges of normal resource utilization data. The ranges of normal resource utilization data also may be referred to as confidence intervals. The confidence intervals are defined by upper and lower bounds that are set by applying an acceptable variance to average measurements of the resource utilization data. The acceptable variance may be a particular number of standard deviations, a percentage of the average measurements, or a fixed value. The confidence intervals indicate a percentage of measurements that are normal, or, in other words, a probability that a measurement is normal. Resource utilization data that fall within the confidence intervals is normal, and resource utilization data that falls outside the confidence intervals is identified and reported as abnormal. The process 300 may be executed by a processor of a computer system that may access the resource utilization data from the computer system, such as a processor of the central server 130 or the desktop computer 140 of FIG. 1.

More particularly, the process 300 begins when the processor accesses historical resource utilization data for one or more computer systems, such as one or more of the computers 110 of FIG. 1 (310). The historical resource utilization data may be accessed from the one or more computer systems or from a central server, such as the central server 130 of FIG. 1, that makes the resource utilization data from the one or more computer systems accessible. The historical resource utilization data is based on resource utilization data that was collected while processes were running on the one or more computer systems and was aggregated to produce resource utilization data for the one or more computer systems.

For example, a collector script may be processed during a first predetermined time interval. The collector script may collect resource utilization data for processes currently running on the one or more computer systems that correspond to one or more computer applications. For example, as discussed with respect to FIG. 2, the collector script may collect resource utilization data of the processes (252), determine a response time of the one or more computer systems (254), and store the resource utilization data of processes and response time in an ASCII file (256).

In addition, a processor script may be processed during a second predetermined time interval. The processor script may determine resource utilization data for the one or more computer applications by aggregating and performing calculations on the resource utilization data that was collected for the processes with the collector script. For example, as discussed with respect to FIG. 2, the processor script may access the resource utilization data of the processes and the response time data generated by the collector script (262). The processor script then may process the process resource utilization data into resource utilization data per user identity (264) and may store the resource utilization data of user identities and response time data in an ASCII file (266).

The historical resource utilization data includes measurements of one or more metrics, and each measurement is associated with a first time interval. The metrics may include performance metrics and capacity metrics.

Examples of performance metrics include CPU utilization, processor or run queue length, disk queue length, disk busy percent, process switch rate, memory swap rate, page scan rate, page fault rate, and response time. The CPU utilization is a percentage of time that a CPU of the computer system is busy. The processor or run queue length is the number of processes in active memory of the computer system that are waiting for execution on a CPU of the computer system. The disk queue length is the average number of transfer requests to be serviced by a disk of the computer system that are outstanding, and the disk busy percent is the percentage of time that the disk is busy servicing transfer requests. The process switch rate is the rate at which the CPU changes the process that is currently running on the CPU. Memory swap rate refers to the number of units of memory per second that are swapped into or out of active memory, page scan rate refers to the number of pages per second that are scanned for removal from active memory, and page fault rate refers to the number of pages per second that are searched for, but not found, in active memory. Response time refers to the time required for a component of the computer system, such as the disk, to respond to a request or an instruction.

Examples of capacity metrics include CPU utilization, disk space, and transient memory space. CPU utilization refers to a percentage of time that a CPU of the computer system is busy. Disk space refers to the amount of formatted space on a persistent disk of the computer system that is available, used, or free, and transient memory space refers to the amount of transient memory that is available, used, or free. A measurement included in the historical resource utilization data may represent a measurement taken at a particular time, an average of measurements taken during a particular time interval, or a maximum or minimum measurement taken during the particular time interval.

The processor also accesses resource utilization data for a computer system (320). The computer system may be one of the computer systems for which historical resource utilization was accessed. Like the historical resource utilization data, the resource utilization data is based on resource utilization data that was collected while processes were running on the computer system and was aggregated to produce resource utilization data for the computer system. For example, the resource utilization data may be collected with a collector script and may be aggregated with a processor script. The resource utilization data includes measurements of one or more performance or capacity metrics, and each measurement is associated with a second time interval that may partially or completely overlap with the first time interval. The measurements included in the resource utilization data may represent a measurement taken at a particular time, an average of measurements taken during a particular time interval, or a maximum or minimum measurement taken during the particular time interval. The resource utilization data may be accessed from the computer system or from the central server. In some implementations, the historical resource utilization data includes the resource utilization data.

The processor performs statistical analysis on the historical resource utilization data to identify ranges of normal measurements for one or more of the metrics included in the historical resource utilization data (330). For example, average values and standard deviations may be calculated for the one or more of the metrics from the measurements included in the historical resource utilization data. A range of normal measurements for the one or more metrics may be defined as the values within a particular number, such as 1 or 1.5, of standard deviations from the average values of the one or more metrics. In addition, regression analysis may be used to predict the range of normal measurements based on the historical resource utilization data. For example, future measurements of the one or more metrics may be predicted based on regression analysis of the measurements of the one or more metrics. The range of normal measurements may be defined as the values within a fixed difference from the predicted measurements. The fixed difference may be a numerical value, a percentage of the predicted measurements, or another statistical confidence interval that indicates a percentage of the predicted measurements that fall within the range of normal measurements.

The range of normal measurements may be calculated using the historical resource utilization data accessed for the one or more computer systems, or using the resource utilization data accessed for the computer system. In one implementation, only a portion of the accessed historic resource utilization data may be used in the identification of the range of normal measurements for the one or more metrics. For example, measurements of the one or more metrics from the historical resource utilization data that are known to be abnormal may not be used in the identification of the range of normal measurements.

The processor compares the measurements of the one or more metrics from the resource utilization data for the particular period of time to the identified ranges of normal measurements for the one or more metrics for the particular period of time (340). Such a comparison is made to identify deviations of the measurements of the one or more metrics of the resource utilization data from the ranges of normal measurements. A deviation may be defined as a measurement for a particular metric that falls outside of the range of normal measurements for the particular metric.

The processor may generate reports indicating the results of the comparison (350). The reports may include charts or graphs that indicate the ranges of normal measurements for the one or more metrics and the measurements for the one or more metrics. More particularly, the reports may identify measurements of the one or more metrics that are outside of the corresponding ranges of normal measurements. Such measurements may represent abnormal operation, suboptimal operation, or failure of one or more computer applications running on the computer system. The generated reports may be given to a system administrator who maintains the computer system such that the system administrator is made aware of the abnormal measurements. The system administrator may then identify and correct the source of the abnormal measurements to enable the computer system to resume normal operation.

Figure 4:
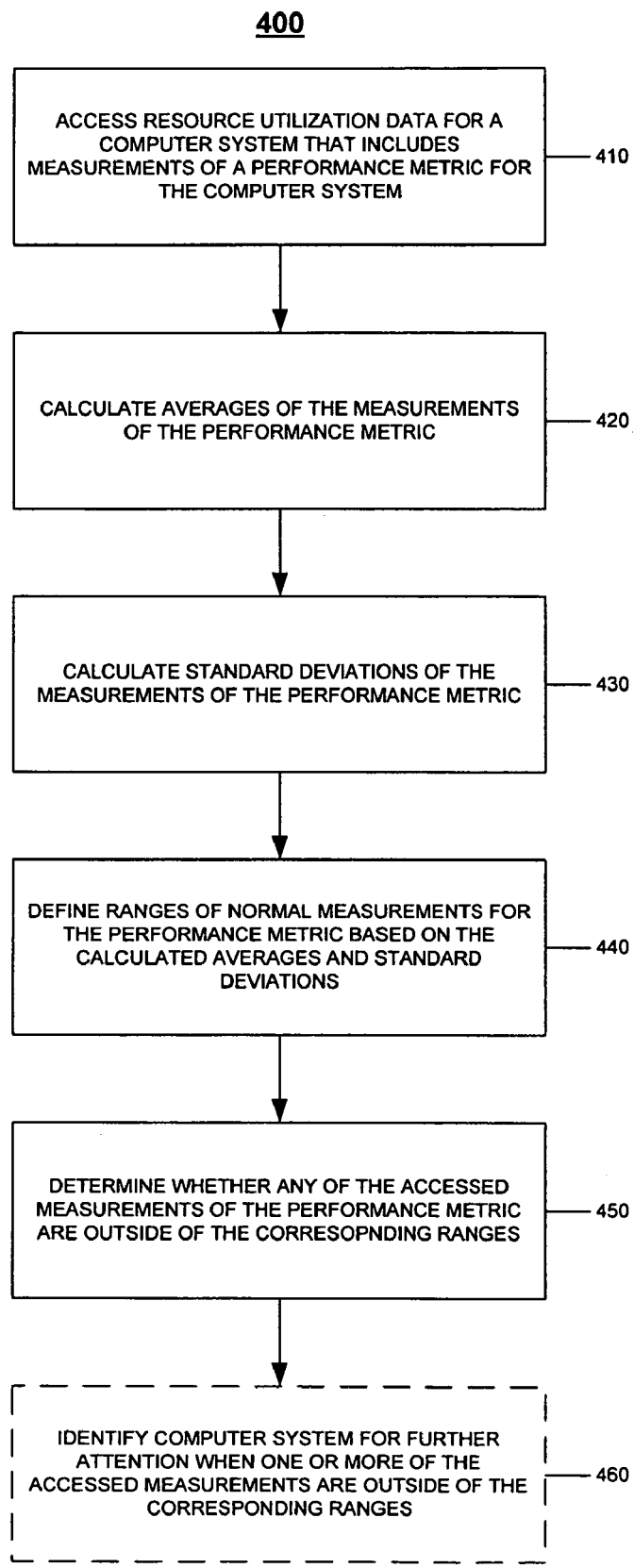
FIG. 4 is a flow chart of a process for identifying and reporting abnormal measurements of a performance metric for a computer system.

Referring to FIG. 4, a process 400 is used to perform statistical analysis of resource utilization data for a computer system to identify abnormal resource utilization data. More particularly, the process 400 is used to identify, for a performance metric included in the resource utilization data, measurements that are outside of a range of values for the performance metric. The performance metric may be a measurement of utilization of a component of the computer system, such as the CPU. The process 400 may be executed once for each performance metric included in the resource utilization data or once for each computer system corresponding to the resource utilization data. The process 400 may be executed by a processor of a computer system that may access the resource utilization data from the computer system, such as a processor of the central server 130 or the desktop computer 140 of FIG. 1.

The process 400 begins when the processor accesses resource utilization data for a computer system (410). The resource utilization data includes measurements of a performance metric for the computer system, such as the utilization of a CPU of the computer system. Each of the measurements corresponds to a particular time when the measurement was taken. For example, the resource utilization data may include measurements of the performance metric taken at the beginning of each hour of a day. The accessed resource utilization data includes multiple measurements of the performance metric for each particular time when a measurement may be taken. For example, the accessed resource utilization data may include measurements of the performance metric taken hourly for several days. In one implementation, the accessed resource utilization data includes a statistically significant number of measurements of the performance metric.

The processor calculates averages of the measurements of the performance metric from the accessed resource utilization data (420). More particularly, an average of the measurements that correspond to a particular time, or a particular time interval, is calculated. For example, an average of the measurements of the performance metric that were taken at 3 P.M. may be calculated. As another example, an average of the measurements of the performance metric that were taken between 9 A.M. and 10 A.M. may be calculated. As a result, an average is calculated for each of the particular times or time intervals at which measurements of the performance metric may be taken.

The processor also calculates standard deviations of the measurements of the performance metric based on the calculated averages (430). The standard deviation of a set of measurements is a measure of the spread or variability of the set of measurements. More particularly, a standard deviation is calculated for each of the particular times at which measurements of the performance metric may be taken, and, consequently, for each of the calculated averages. For example, a standard deviation for the measurements of the performance metric that were taken at 3 P.M. may be calculated using the calculated average of such measurements.

The processor defines ranges of normal measurements for the performance metric based on the calculated averages and standard deviations (440). More particularly, a range of normal measurements is defined for each of the particular times at which measurements of the performance metric may be taken, and, consequently, for each pair of an average and a corresponding standard deviation. In one implementation, a range of normal measurements for a particular time is defined as measurements taken at the particular time that are within one standard deviation of the average for the particular time. In such an implementation, each range may be defined by upper and lower bounds. The upper bound may be the sum of the average and the standard deviation, and the lower bound may be the average less the standard deviation.

The processor determines whether any of the measurements of the performance metric are outside of the corresponding ranges (450). For example, a determination may be made as to whether a measurement that was taken at 3 P.M. is outside of the range of normal measurements taken at 3 P.M. A measurement may be outside of a corresponding range of normal measurements if the measurement is less than the lower bound of the range or is greater than the upper bound of the range.

If one or more measurements of the performance metric fall outside of the corresponding ranges of normal measurements, the processor may identify the computer system for further attention (460). Measurements falling outside of the corresponding ranges of normal measurements are indicative of abnormal operation, suboptimal operation, or failure of the computer system, which consequently may require attention or maintenance. The computer system may be identified for further attention through creation of a report that identifies the abnormal measurements. The report may include graphs or charts that include indications of the ranges normal measurements for the particular times and some or all of the measurements of the performance metric. The report may be given to a system administrator of the computer system who then may identify and correct the source of the abnormal measurements.

Such identification of the computer system for further attention may be particularly useful when the process 400 is executed multiple times for multiple performance metrics included in the accessed resource utilization data or for multiple computer systems corresponding to the accessed resource utilization data. For example, the process 400 may be executed once for each of hundreds or thousands of computer systems. In such a case, it may be useful only to identify for further attention the computer systems for which abnormal resource utilization data is identified such that other normally operating computer systems are not identified for further attention. Additionally or alternatively, abnormal measurements may be the only measurements that are identified for the identified computer systems, which may help an analyst more easily identify the abnormal measurements from the resource utilization data for the identified computer systems for use in determining how to maintain the identified computer systems.

Defining normal measurements as measurements that differ from the averages by less than a particular number of corresponding standard deviations may be more accurate than defining normal measurements as measurements that differ from the averages by less than fixed differences, such as particular amounts or percentages of the averages. The standard deviation for a particular time quantifies the spread or the variability among measurements of the performance metric used to calculate the average measurement for the particular time. A high standard deviation indicates a high amount of variability, which indicates that measurements within a relatively wide range were used to calculate the average and that a relatively wide spread among measurements is normal. A wide spread may indicate that only a relatively large variation of a measurement from a corresponding average measurement indicative of abnormal operation of the computer system, and a range of normal measurements defined by a fixed difference may be narrower than a range of normal measurements defined by a standard deviation. As a result, the range defined by the fixed difference may indicate that a measurement is abnormal, even though the measurement is in fact normal, as may be indicated by the range defined by the standard deviation.

Similarly, a low standard deviation indicates a low amount of variability, which indicates that measurements within a relatively narrow range were used to calculate the average and that a relatively narrow spread among measurements is normal. A narrow spread indicates that a relatively small variation of a measurement from a corresponding average measurement is indicative of abnormal operation of the computer system. Therefore, a range of normal measurements defined by a fixed difference may be wider than a range of normal measurements defined by a standard deviation. As a result, the range defined by the fixed difference may indicate that a measurement is normal, even though the measurement is in fact abnormal, as may be indicated by the range defined by the standard deviation.

Therefore, standard deviations represent a single method for representing both wide and narrow ranges of normal measurements, depending on the spread of the measurements used to calculate the standard deviations, which is indicative of an appropriate width for the range of normal measurements. By comparison, fixed differences represent a single method for representing ranges of normal measurements of only one fixed width, regardless of any indication of an appropriate width for the range. However, fixed differences may be more appropriate than standard deviations in particular implementations, such as, for example, when a statistically significant number of measurements are not available to calculate the standard deviations.

Figure 5:
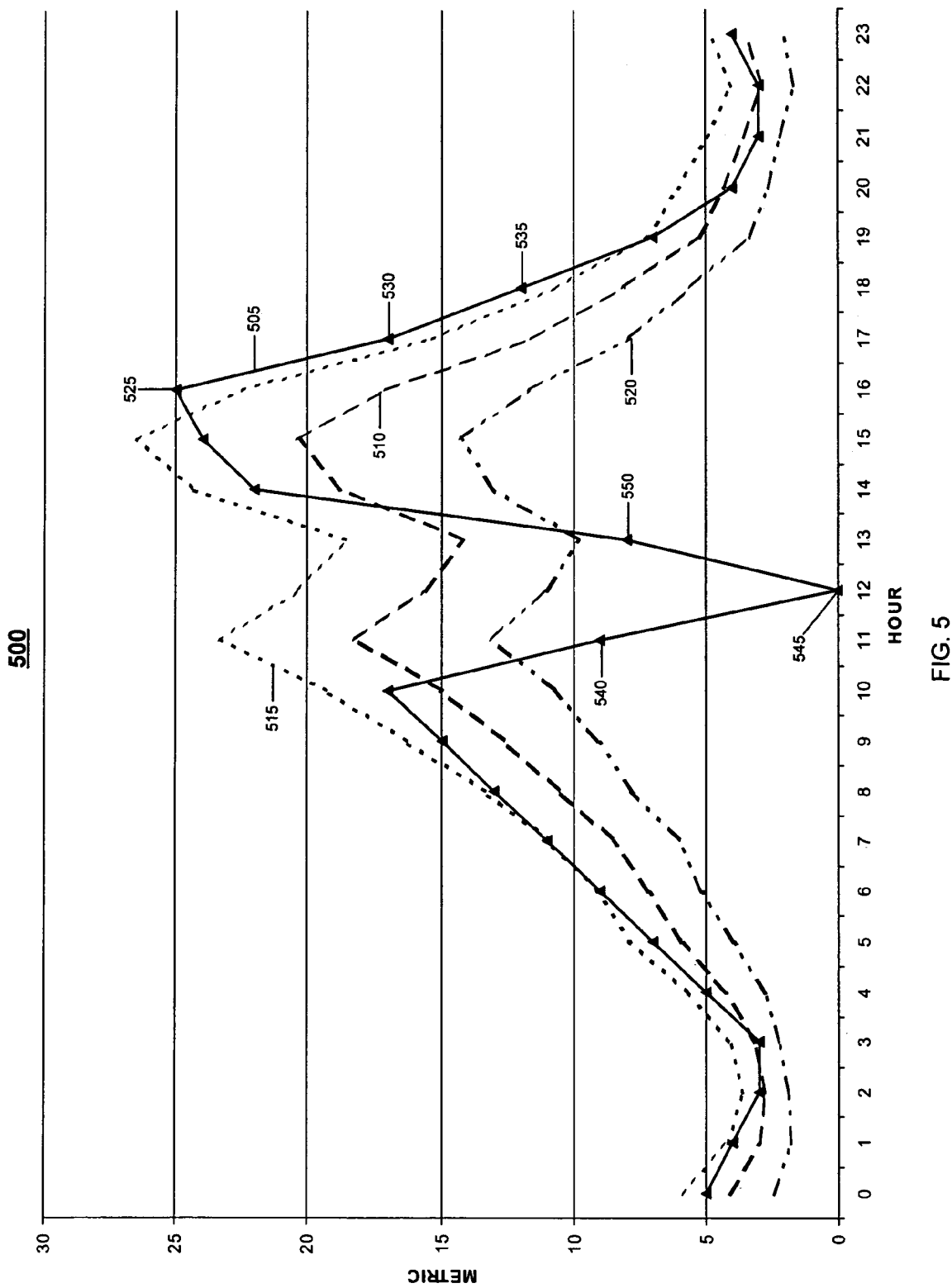
FIG. 5 is an illustration of a graph that indicates abnormal measurements of a performance metric for a computer system.

Referring to FIG. 5, a report of abnormal resource utilization data may include a graph 500. The graph 500 illustrates a series of actual measurements of a performance metric from the resource utilization data, as well as indications of ranges of normal measurements of the performance metric. More particularly, the graph 500 includes a plot 505 of actual measurements of a performance metric from the resource utilization data and plots 510-520 that define the average 510, the upper bound 515, and the lower bound 520 for normal measurements, and that collectively define the ranges of normal measurements of the performance metric. Points 525-550 correspond to actual measurements of the performance metric that are outside of the normal ranges.

The graph 500 plots measurements of the performance metric from the resource utilization data against the times at which the measurements were taken. For example, the measurements of the performance metric may have been taken hourly, and each measurement of the performance metric may be plotted against the hour at which the measurement was taken. More particularly, the X-axis indicates the hours at which the measurements are taken, and the Y-axis indicates the magnitudes of the measurements.

The plot 505 illustrates the actual measurements of the performance metric from the resource utilization data. The points of the plot 505, represented by the triangular markings on the graph 500, each represent an individual measurement of the performance metric taken at a particular time.

The plot 510 illustrates average measurements of the performance metric. Each point in the plot 510 corresponds to an average of measurements of the performance metric that were taken at a time corresponding to the point. For example, the point in the plot 510 corresponding to hour 11 represents the average of a set of measurements of the performance metric that were taken at the eleventh hour of multiple days.

The plots 515 and 520 illustrate upper and lower bounds, respectively, for the ranges of normal measurements for the performance metric. The measurements of the performance metric from the plots 515 and 520 corresponding to a particular time define a range of normal measurements of the performance metric taken at the particular time. More particularly, the corresponding measurement from the plot 515 defines the upper bound of the range, and the corresponding measurement from the plot 520 defines the lower bound of the range. The range includes the average measurement for the particular time, so, for any particular time, a point from the plot 510 corresponding to the particular time is between the points of the plots 515 and 520 corresponding to the particular time. In one implementation, the upper bound is one standard deviation above the average measurement and the lower bound is one standard deviation below the average measurement.

If a point from the plot 505 corresponding to a particular time is between points from the plots 515 and 520 corresponding to the particular time, the measurement of the performance metric corresponding to that point is considered to be normal. However, if the point from the plot 505 is not between the corresponding points from the plots 515 and 520, then the measurement of the performance metric corresponding to that point is considered to be abnormal. For example, the points 525-550 correspond to abnormal measurements of the performance metric because the points 525-550 fall outside of the ranges of normal measurements defined by the plots 515 and 520. The point 545 represents a measurement of the performance metric that has a zero value, which represents a failure of an application running on the computer system or of the computer system itself.

Figure 6:
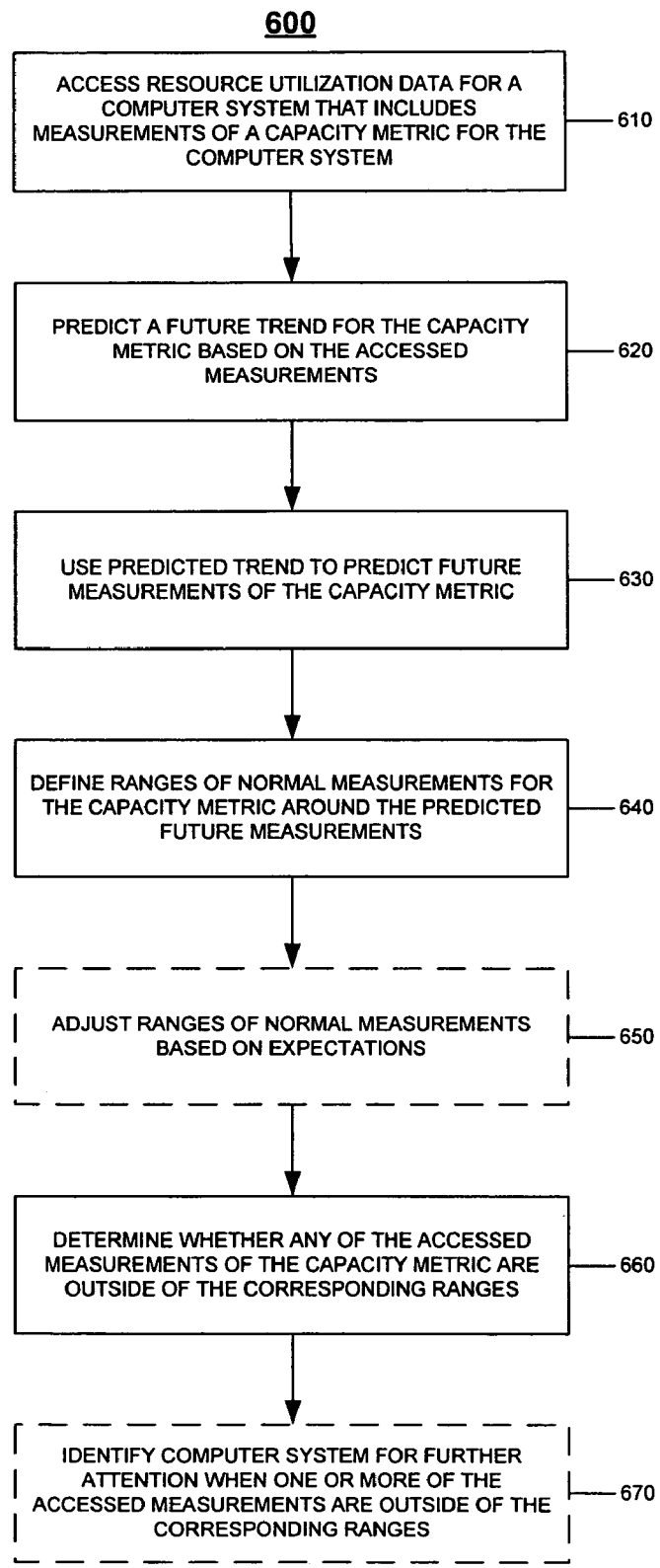
FIG. 6 is a flow chart of a process for identifying and reporting abnormal measurements of a capacity metric for a computer system.

Referring to FIG. 6, a process 600 is used to perform statistical analysis of resource utilization data for a computer system to identify abnormal resource utilization data. More particularly, the process 600 is used to identify measurements of a capacity metric included in the resource utilization data that are outside of predicted ranges of normal measurements for the capacity metric. The capacity metric may be a measurement of utilization of a component of the computer system, such as physical or transient memory of the computer system. The process 600 may be executed once for each capacity metric included in the resource utilization data. The process 600 may be executed by a processor of a computer system that may access the resource utilization data from the computer system, such as a processor of the central server 130 or the desktop computer 140 of FIG. 1.

The process 600 begins when the processor accesses resource utilization data for a computer system (610). The resource utilization data includes multiple measurements of a capacity metric for the computer system, such as the utilization of memory of the computer system, that are each taken at a particular time. For example, the resource utilization data may include measurements of the capacity metric taken at a particular time each day for several days. The measurements of the capacity metric form two sets. A first set of measurements represents historical resource utilization data that is used to predict future measurements and ranges of normal measurements for the capacity metric. A second set of measurements represents actual measurements of the capacity metric that are compared to the predicted future measurements and ranges of normal measurements for the capacity metric.

The processor predicts a future trend for the capacity metric based on the accessed measurements of the capacity metric (620). More particularly, a trend for a first set of measurements is identified for use in predicting future measurements of the capacity metric. In one implementation, linear regression is used to identify the trend. The linear regression identifies a linear equation that approximates the first set of measurements as a function of the times when the measurements were taken. The linear equation describes a line that best fits the first set of measurements when plotted against the corresponding times when the measurements were taken.

The processor uses the predicted trend to predict future measurements of the capacity metric (630). More particularly, the linear equation is used to predict future measurements of the capacity metric at times corresponding to the second set of measurements from the accessed resource utilization data. For example, the linear equation may be used to predict a future measurement of the capacity metric for each day on which a measurement from the second set of measurements was taken. As a result, an actual and predicted measurement corresponds to each of the times at which a measurement from the second set of measurements was taken. When a measurement from the second set of measurements represents an average, maximum, or minimum measurement taken during a time interval, the predicted measurements also represent an average, maximum or minimum measurement, respectively, taken during the time interval.

The processor defines ranges of normal measurements for the capacity metric around the predicted future measurements (640). More particularly, a range of normal measurements is defined for each of the times corresponding to the second set of measurements. For example, a range of normal measurements may be defined for each day on which a measurement from the second set of measurements was taken. In one implementation, a range of normal measurements for a particular time is defined as measurements taken at the particular time that are within a fixed difference from the predicted future measurement for the particular time. The fixed difference may be defined as a percentage of the predicted future measurement or as a fixed value. In such an implementation, each range may be defined by upper and lower bounds. The upper bound may be the sum of the average and the fixed difference, and the lower bound may be the difference of the average and the fixed difference. The ranges of normal measurements are not defined based on averages and standard deviations when a statistically large enough number of actual measurements with which to calculate the averages and the standard deviations is not available.

The processor may adjust the ranges of normal measurements based on expected changes to measurements of the capacity metric at the times corresponding to the second set of measurements (650). For example, if measurements of the capacity metric are expected to rise at the times corresponding to the second set of measurements, the ranges of normal measurements may be modified to reflect the expected rise. An adjustment may be made to the range of normal measurements for each of the times corresponding to the second set of measurements. The expected changes may be based on multiple factors, such as an expected increase or decrease in the number of transactions handled by the computer system, which may require utilization of an increased or decreased amount of memory. In one implementation, the expected changes are manually specified by a user of the computer system executing the process 600.

The processor determines whether any of the measurements of the capacity metric from the second set of measurements are outside of the corresponding ranges of normal measurements (660). For example, a determination is made as to whether a measurement that was taken on a particular day is outside of the range of normal measurements taken on the particular day. A measurement may be outside of a corresponding range of normal measurements if the measurement is less than the lower bound of the range or is greater than the upper bound of the range.

If one or more measurements of the capacity metric from the second set of measurements fall outside of the corresponding ranges of normal measurements, the processor may identify the computer system for further attention (670). Measurements falling outside of the corresponding ranges of normal measurements are indicative of abnormal operation, sub-optimal operation, or failure of the computer system that may require attention or maintenance. The computer system may be identified for further attention through creation of a report that identifies the abnormal measurements. The report may include graphs or charts that include indications of the ranges normal measurements and some or all of the measurements of the capacity metric. The report may be given to a system administrator of the computer system such that the system administrator may identify and correct the source of the abnormal measurements.

Such identification of the computer system for further attention may be particularly useful when the process 600 is executed multiple times for multiple capacity metrics included in the accessed resource utilization data or for multiple computer systems corresponding to the accessed resource utilization data. In such a case, only those computer systems requiring attention may be identified, and only abnormal resource utilization data may be identified for those computer systems.

Figure 7:
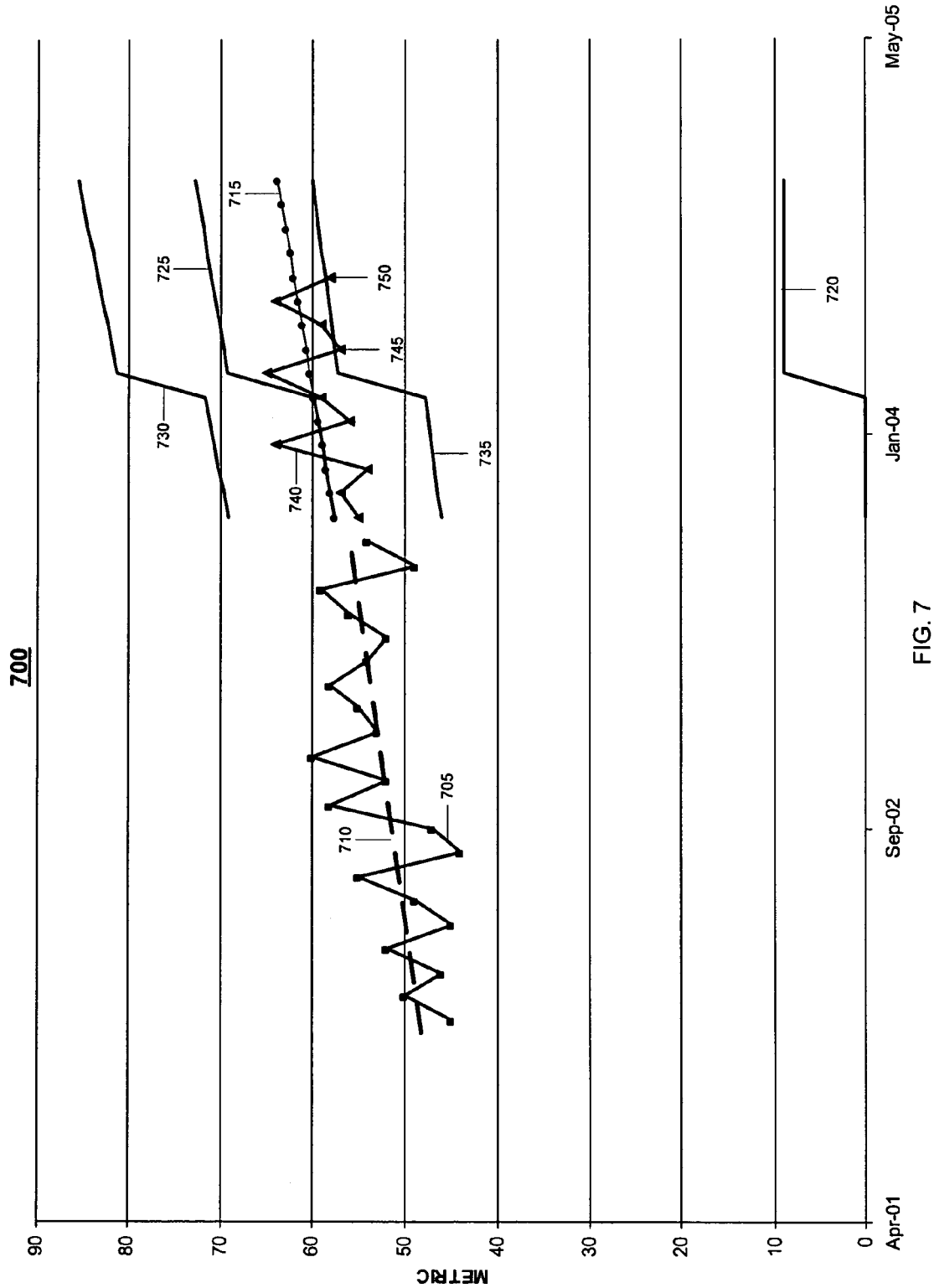
FIG. 7 is an illustration of a graph that indicates abnormal measurements of a capacity metric for a computer system.

Referring to FIG. 7, a report of abnormal resource utilization data may include a graph 700. The graph 700 illustrates actual measurements of a capacity metric from the resource utilization data, as well as indications of predicted ranges of normal measurements of the capacity metric. More particularly, the graph 700 includes a plot 705 of a first set of the actual measurements and a trend line 710 for the plot 705. A plot 715 illustrates predicted measurements of the capacity metric, and a plot 720 illustrates expected adjustments to the predicted measurements. Plots 725-735 collectively define the predicted ranges, and a plot 740 illustrates a second set of actual measurements. Points 745 and 750 correspond to actual measurements from the second set of actual measurements of the capacity metric that are outside of the predicted ranges.

The graph 700 plots actual and expected measurements of the capacity metric from the resource utilization data against the times at which the measurements were or will be taken. For example, the actual measurements of the capacity metric may have been taken daily, and each measurement of the capacity metric may be plotted against the day on which the measurement was taken. More particularly, the X-axis indicates the days on which the measurements are taken, and the Y-axis indicates the magnitudes of the measurements.

The plots 705 and 740 illustrate the first set and the second set, respectively, of actual measurements of the capacity metric from the resource utilization data. The actual measurements illustrated by the plot 705 are taken during a first time period, and the measurements illustrated by the plot 740 are taken during a second time period that begins after the first time period. Each of the points of the plots 705 and 740 represents an individual measurement of the capacity metric taken at a particular time. Abnormal measurements for the capacity metric may be identified from the second set of measurements based on statistical analysis of the first set of measurements. More particularly, the first set of measurements is used to predict expected ranges of normal measurements for the capacity metric at times corresponding to the second set of measurements. The measurements in the first set may be chosen as a result of being accurate, reliable, or indicative of future measurements of the capacity metric. For example, previous statistical analysis may have identified measurements included in the first set of measurements as normal and therefore may be useful in predicting future normal measurements.

The plot 710 is a trend line for the plot 705 of the first set of actual measurements. In one implementation, the plot 710 is generated by performing linear regression on the points of the plot 705. The plot 710 extends between times at which the earliest and the latest actual measurements of the capacity metric that are included in the plot 705 were taken. The plot 715, which illustrates predicted measurements of the capacity metric, is an extension of the plot 710. More particularly, the plot 715 includes points that would fall on the plot 710 if the plot 710 were extended to a time beyond the time at which the latest actual measurement illustrated by the plot 705 was taken. The plot 715 is generated through extrapolation of the plot 710 using a linear equation generated by the linear regression. The plot 715 may include a point for each actual measurement of the capacity metric illustrated by the plot 740.

The plot 720 illustrates expected adjustments to measurements of the capacity metric taken at the times corresponding to the measurements from the second set of actual measurements. More particularly, the plot 720 may illustrate an expected adjustment for each time at which a measurement from the second set was taken. The plot 720 may take any shape to represent any expected change and need not necessarily illustrate a single and persistent increase in measurements of the capacity metric, as illustrated in FIG. 7. For example, the plot 720 may have one or more upward or downward spikes to represent temporary changes in the measurements of the capacity metric.

The plot 725 illustrates expected average measurements of the capacity metric. Each point in the plot 725 corresponds to a measurement of the capacity metric that is the sum of a predicted measurement of the capacity metric represented by a point of the plot 715 corresponding to the particular time and an expected adjustment to the predicted measurement represented by a point in the plot 720 corresponding to the particular time. Therefore, at times when the plot 720 represents no expected adjustment, the plot 725 overlaps with the plot 715.

The plots 730 and 735 illustrate upper and lower bounds, respectively, for the ranges of normal measurements for the capacity metric. The measurements of the capacity metric from the plots 730 and 735 corresponding to a particular time define a range of normal measurements of the capacity metric taken at the particular time. More particularly, the corresponding measurement from the plot 730 defines the upper bound of the range, and the corresponding measurement from the plot 735 defines the lower bound of the range. The range includes the average measurement for the particular time such that a point from the plot 725 corresponding to the particular time is between the points of the plot 730 and 735 corresponding to the particular time. In one implementation, the upper bound is a fixed value or percentage of the average measurement above the average measurement and the lower bound is a fixed value or percentage of the average measurement below the average measurement. The range of normal measurements for a particular time is illustrated by points of the plots 730 and 735 corresponding to the particular time and is predicted based on actual measurements of the capacity metric taken before the particular time rather than before and after, or at the same time as the particular time.

If a point from the plot 740 corresponding to a particular time is between points from the plots 730 and 735 corresponding to the particular time, the measurement of the capacity metric corresponding to the point from the plot 740 is considered to be normal. However, if the point from the plot 740 is not between the corresponding points from the plots 730 and 735, then the measurement of the capacity metric corresponding to the point from the plot 740 is considered to be abnormal. For example, the points 745 and 750 correspond to abnormal measurements of the capacity metric because the points 745 and 750 fall outside of the range of normal measurements defined by the plots 730 and 735. The points 745 and 750 represent abnormal measurements because the expected adjustments represented by the plot 720 did not occur. The expected adjustments caused the range of normal measurements to be moved from where it would be if no adjustments were expected such that the points 745 and 750 are not included in the range of normal measurements.

Figure 8:
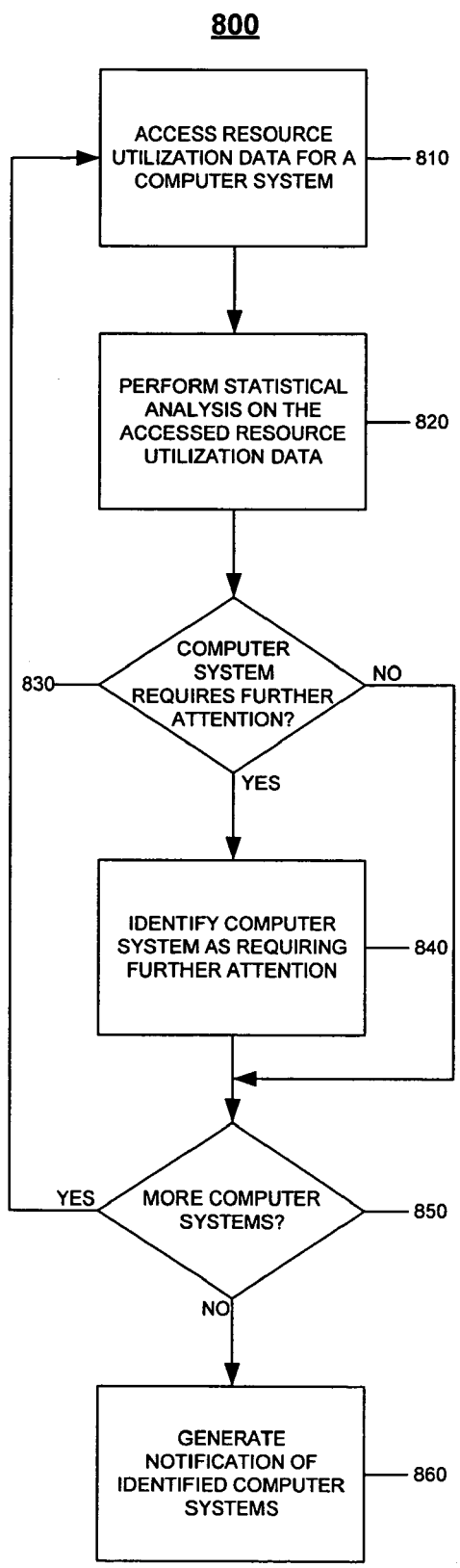
FIG. 8 is a flow chart of a process for identifying and reporting abnormal resource utilization data for multiple computer systems.

Referring to FIG. 8, a process 800 is used to analyze resource utilization data for multiple computer systems. Reports of abnormal resource utilization data are generated for only the computer systems for which abnormal resource utilization data is identified. The process 800 may be executed by a processor of a central server of resource utilization data, such as the central server 130 of FIG. 1, or by a processor of some other computer system that may access the resource utilization data from the multiple computer systems. Alternatively, the process 800 may be executed by a processor of a computer that may access the resource utilization data from the central server.

The process 800 begins when the processor accesses resource utilization data for one of the multiple computer systems (810). The resource utilization data for the computer system may be accessed directly from the computer system. Alternatively, the resource utilization data may be accessed from a central server to which the resource utilization data is transferred from the computer system.

The processor performs statistical analysis on the accessed resource utilization data (820). Performing statistical analysis may identify abnormalities in the accessed resource utilization data for the computer system. The abnormal resource utilization data may be identified in a report generated by the statistical analysis for the computer system. Performing the statistical analysis may include executing the process 300 of FIG. 3, executing the process 400 of FIG. 4 once for each performance metric included in the accessed resource utilization data, or executing the process 600 of FIG. 6 once for each capacity metric included in the accessed resource utilization data.

The processor determines whether the computer system corresponding to the accessed resource utilization data requires further attention (830). More particularly, a determination is made as to whether abnormal resource utilization data was identified for the computer system. If so, then the computer system may require further attention in order to identify and handle the cause of the abnormal resource utilization data. As a result, the computer system is identified as requiring further attention (840). Doing so may include saving the report of the abnormal resource utilization data generated by the statistical analysis with a set of reports of abnormal resource utilization data for the computer systems requiring further attention. The computer system also may be identified as requiring further attention by being added to a list or set of computer systems that require further attention.

After identifying the computer system as requiring further attention (840), or if the computer system does not require further attention (830), the processor determines whether resource utilization data corresponding to another computer system is to be analyzed (850). If so, then the processor accesses as yet unanalyzed resource utilization data for a computer system (810), performs statistical analysis on the accessed resource utilization data (820), and identifies the computer system as requiring further attention if necessary (840). In this manner, resource utilization data for all computer systems is analyzed sequentially and those computer systems that require further attention as a result of being associated with abnormal resource utilization data are identified.

The processor generates a notification of the identified computer systems (860). For example, a composite report including the reports of abnormal resource utilization data for the computer systems associated with the abnormal resource utilization data may be generated. Alternatively or additionally, a list of the identified computer systems may be generated such that the reports of abnormal resource utilization data corresponding to the identified computer systems may be accessed.

Figure 9:
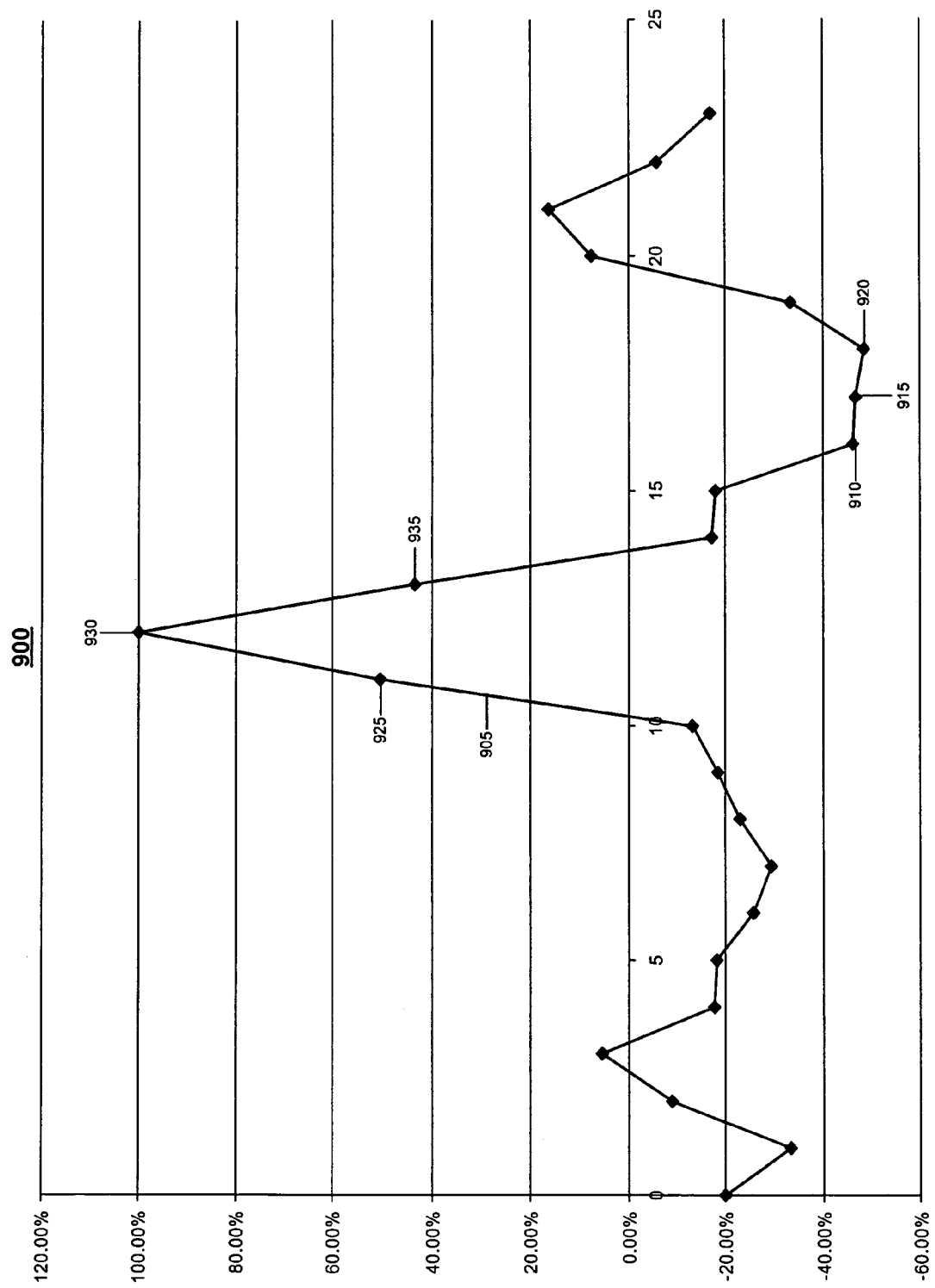
FIG. 9 is an illustration of a graph that indicates the impact of abnormal resource utilization data.

Referring to FIG. 9, a report of abnormal resource utilization data for a computer system may include a graph 900 that illustrates amounts by which actual measurements of a performance metric deviate from average measurements of the performance metric. A plot 905 that includes points 910-935 indicates the deviations of the actual measurements from the average measurements. The actual measurements correspond to the actual measurements represented by the plot 505 of FIG. 5, and the average measurements correspond to the average measurements represented by the plot 510 of FIG. 5. In other words, each point of the plot 905 corresponds to a point from each of the plots 505 and 510.

The deviation of an actual measurement corresponding to a particular time from an average of measurements taken at the particular time is quantified as a percentage of the average. More particularly, the difference between the actual measurement and the average measurement is divided by the average measurement such that the deviation is represented as a fraction or a percentage of the average measurement, which may be more informative than representing the deviation only as the difference between the actual measurement and the average measurement. For example, a seemingly large difference may correspond to a small percentage, and a seemingly small difference may correspond to a large percentage. Therefore, the size of the difference may be misleading as to the relative impact or magnitude of the difference.

The graph 900 plots the percentages representing the deviations of the actual measurements from the corresponding average measurements against the times at which the actual measurements that were used to calculate the percentages were taken. For example, if the measurements were taken hourly, each percentage may be plotted against the hour at which the corresponding actual measurements were taken. More particularly, the X-axis indicates the hours at which the measurements were taken, and the Y-axis indicates the percentages.

The plot 905 illustrates the percentages representing the deviations of the actual measurements from the average measurements. The points of the plot 905, represented by the diamond-shaped markings on the graph 900, each represent a deviation of an actual measurement from a corresponding average measurement. Points corresponding to percentages close to zero percent represent small deviations, while points corresponding to percentages farther away from zero percent represent larger deviations. A point corresponding to a percentage far away from zero percent may correspond to an actual measurement that is outside of a range of normal measurements for the performance metric for a particular time corresponding to the point and to the actual measurement. For example, the points 910-935, which are the points of the plot 905 corresponding to percentages that are farthest from zero percent, correspond to the points 525-550 of FIG. 5, respectively, which are outside of corresponding ranges of normal measurements. The deviation of 100% illustrated by the point 930 represents a failure of an application running on the computer system or of the computer system itself, as represented by the corresponding point 545 of FIG. 5. In some implementations, the graph 900 may include additional plots to represent the maximum amount by which an actual measurement may deviate from an average measurement and still be considered to represent a normal measurement.

Graphs similar to the graph 900 indicating deviations of actual measurements of a capacity metric from predicted measurements for the capacity metric also may be included in reports of abnormal resource utilization data. Such graphs may represent the deviations of actual measurements of the capacity metric as percentages of predicted measurements for the capacity metric.

Various statistical analyses are used throughout for identifying ranges of normal measurements of metrics included in resource utilization data gathered for a computer system and for identifying abnormal measurements of the metrics. For example, average measurements and standard deviations may be used to define the ranges of normal measurements. As another example, regression analysis may be used to predict future measurements of a metric such that the ranges of normal measurements may be defined around the predicted future measurements. In addition, other statistical analyses may be used to identify the ranges of normal values and to identify the abnormal measurements. For example, the normal ranges may be defined as being within fixed differences from average measurements, with the fixed differences being particular amounts or percentages of the average.

Measurements of performance and capacity metrics are described throughout as being taken at regular intervals. For example, measurements of a performance metric are described as being taken hourly for several days, and measurements of a capacity metric are described as being taken once a day for several days. However, measurements of performance and capacity metrics may be taken at intervals of any length, such as every minute or once every 45 seconds. Alternatively or additionally, the measurements may be taken at irregular intervals, such as, for example, at the time of occurrence of a particular event or when a particular condition is satisfied. In addition, measurements may be taken multiple times during an interval, and the measurement for the interval may be an average of the multiple measurements taken during the interval, or an extreme measurement taken during the interval.

Measurements of performance and capacity metrics for a computer system may relate to a user's use of the computer system. For example, high measurements for a metric may indicate that the user is actively and productively using the computer system, and low measurements may indicate that the user is not using the computer system. The low measurements may relate to an outage or failure of a resource of the computer system, which may adversely affect the productivity of the user. Therefore, the measurements of the metrics may be used to estimate the productivity of the user using the computer system.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method for identifying computer resource utilization issues, the method comprising:
   accessing resource utilization data for a computer system for a particular period of time wherein:
      the resource utilization data comprises a measure of an amount of usage of one or more resources of the computer system;
      the resource utilization data for the particular period of time is based on resource utilization data collected while processes were running on the computer system; and
      the resource utilization data for the particular period of time includes a plurality of measurements of a utilization metric of operation of a component of the computer system, with each measurement being associated with a period of time;
   performing statistical analysis on the resource utilization data to identify a range of normal measurements for the utilization metric for the particular period of time included in the resource utilization data, wherein performing statistical analysis on the resource utilization data comprises performing calculations using the plurality of measurements and wherein the identified range of normal measurements encompasses a portion of the plurality of measurements; and
   comparing the plurality of measurements of the metric of the resource utilization data of the resource utilization data for the particular period of time with the identified range of normal measurements to identify measurements from the plurality of measurement that are outside of the identified range of normal measurements.

2. The method of claim 1 further comprising generating a report that identifies measurements from the plurality of measurements of the utilization metric that are outside of the identified range of normal measurements.

3. The method of claim 2 wherein generating a report comprises generating one or more charts that include indications of the identified range of normal measurements for the utilization metric and the plurality of measurements of the utilization metric.

4. The method of claim 2 wherein accessing resource utilization data comprises accessing resource utilization data that is based on resource utilization data collected while processes were running on one or more computer systems and aggregated to produce resource utilization data for the one or more computer systems.

5. The method of claim 4 wherein generating the report that identifies measurements from the plurality of measurements of the utilization metric that are outside of the identified range of normal measurements comprises generating reports indicating measurements from the plurality of measurements that are outside of the corresponding ranges of normal measurements for only the computer systems on which those measurements occurred.

6. The method of claim 1 wherein at least one measurement from the plurality of measurements that is outside of the identified range of normal measurements represents failure of one or more computer applications running on the computer system.

7. The method of claim 1 further comprising accessing historical resource utilization data for a computer system wherein:
   the historical resource utilization data is based on resource utilization data collected while processes were running on the computer system, and the historical resource utilization data includes measurements of the utilization metric, with each measurement being associated with a period of time.

8. The method of claim 7 wherein performing statistical analysis comprises performing statistical analysis on the historical resource utilization data to identify the range of normal measurements.

9. The method of claim 8 wherein performing statistical analysis comprises identifying a range of measurements within a predetermined number of standard deviations from an average measurement of the plurality of measurements of the utilization metric for the particular period of time as the range of normal measurements for the utilization metric for the particular period of time.

10. The method of claim 8 wherein performing statistical analysis comprises:
calculating predicted values of future measurements of the utilization metric based on the historical resource utilization data; and
using the predicted values to identify the range of normal measurements of the utilization metric for the particular period of time.

11. The method of claim 1 wherein accessing the resource utilization data comprises accessing the resource utilization data from a central server.

12. The method of claim 1 wherein accessing the resource utilization data comprises accessing the resource utilization data from the computer system.

13. The method of claim 1 wherein performing the statistical analysis comprises performing the statistical analysis on a computer system that is separate from the computer system for which the resource utilization data is accessed.

14. A computer-readable storage device storing instructions operable to cause data processing apparatus to :
access resource utilization data for a computer system for a particular period of time wherein:
the resource utilization data comprises a measure of an amount of usage of one or more resources of the computer system;
the resource utilization data for the particular period of time is based on resource utilization data collected while processes were running on the computer system, and
the resource utilization data for the particular period of time includes a plurality of measurements of a utilization metric of operation of a component of the computer system, with each measurement being associated with a period of time;
perform statistical analysis on the resource utilization data to identify a range of normal measurements for the utilization metric for the particular period of time included in the resource utilization data, wherein performing statistical analysis on the resource utilization data comprises performing calculations using the plurality of measurements and wherein the identified range of normal measurements encompasses a portion of the plurality of measurements; and
compare the plurality of measurements of the utilization metric of the resource utilization data for the particular period of time with the identified range of normal measurements to identify measurements from the plurality of measurements that are outside of the identified range of normal measurements.

15. The computer-readable medium of claim 14 wherein the instructions further cause the processor to generate a report that identifies measurements from the plurality of measurements of the utilization metric that are outside of the identified range of normal measurements.

16. The computer-readable medium of claim 15 wherein generating a report comprises generating one or more charts that include indications of the identified range of normal measurements for the utilization metric and the plurality of measurements of the metric.

17. The computer-readable medium of claim 15 wherein accessing resource utilization data comprises accessing resource utilization data that is based on resource utilization data collected while processes were running on one or more computer systems and aggregated to produce resource utilization data for the one or more computer systems.

18. The computer-readable medium of claim 17 wherein generating the report that identifies measurements from the plurality of measurements of the utilization metric that are outside of the identified range of normal measurements comprises generating reports indicating measurements from the plurality of measurements that are outside of the corresponding ranges of normal measurements for only the computer systems on which those measurements occurred.

19. The computer-readable medium of claim 14 wherein at least one measurement from the plurality of measurements that is outside of the identified range of normal measurements represents failure of one or more computer applications running on the computer system.

20. The computer-readable medium of claim 14 wherein the instructions further cause the processor to access historical resource utilization data for a computer system wherein:
the historical resource utilization data is based on resource utilization data collected while processes were running on the computer system, and
the historical resource utilization data includes measurements of the metric, with each measurement being associated with a period of time.

21. The computer-readable medium of claim 20 wherein performing statistical analysis comprises performing statistical analysis on the historical resource utilization data to identify the range of normal measurements.

22. The computer-readable medium of claim 21 wherein performing statistical analysis comprises identifying a range of measurements within a predetermined number of standard deviations from an average measurement of from the plurality of measurements of the utilization metric for the particular period of time as the range of normal measurements for the utilization metric for the particular period of time.

23. The computer-readable medium of claim 21 wherein performing statistical analysis comprises:
calculating predicted values of future measurements of the utilization metric based on the historical resource utilization data; and
using the predicted values to identify the range of normal measurements of the utilization metric for the particular period of time.

24. The computer-readable medium of claim 14 wherein accessing the resource utilization data comprises accessing the resource utilization data from a central server.

25. The computer-readable medium of claim 14 wherein accessing the resource utilization data comprises accessing the resource utilization data from the computer system.

26. The computer-readable medium of claim 14 wherein performing the statistical analysis comprises performing the statistical analysis on a computer system that is separate from the computer system for which the resource utilization data is accessed.

* * * * *

UNITED STATES PATENT AND TRADEMARK OFFICE
CERTIFICATE OF CORRECTION

| | | |
|---|---|---|
| PATENT NO. | : 7,437,446 B2 | Page 1 of 1 |
| APPLICATION NO. | : 10/977497 | |
| DATED | : October 14, 2008 | |
| INVENTOR(S) | : Philip G. Bailey and Peter M. W. Poortman | |

It is certified that error appears in the above-identified patent and that said Letters Patent is hereby corrected as shown below:

Title Page, Item [56] Related U.S. Application Data – delete "2002." and insert -- 2002, now Pat. No. 7,243,145. --

Title Page, Item [74] Attorney, Agent, or Firm – delete "p.c." and insert -- P.C. --

Column 1, line 8 claim 1 – after "2002," insert -- now Pat. No. 7,243,145 --

Column 24, line 28 (approx.) claim 1 – before "metric" insert -- utilization --

Column 24, lines 29-30 (approx.) claim 1 – after "data" delete "of the resource utilization data"

Column 24, line 32 (approx.) claim 1 – delete "measurements" and insert -- measurement --

Column 25, line 34 claim 14 – delete "to :" and insert -- to: --

Column 25, line 36 claim 14 – after "period" delete "of time"

Column 25, line 38 claim 14 – delete "resources" and insert -- resource --

Column 26, line 7 claim 16 – after "the" insert -- utilization --

Column 26, line 43 claim 22 – after "of" delete "from"

Signed and Sealed this

Tenth Day of March, 2009

JOHN DOLL
*Acting Director of the United States Patent and Trademark Office*